US012003469B2

(12) United States Patent
Suh et al.

(10) Patent No.: US 12,003,469 B2
(45) Date of Patent: Jun. 4, 2024

(54) PERSONALIZED MESSAGING SERVICE SYSTEM, PERSONALIZED MESSAGING SERVICE METHOD, AND USER TERMINAL PROVIDED WITH THE PERSONALIZED MESSAGING SERVICE

(71) Applicant: DEAR U CO., LTD., Seoul (KR)

(72) Inventors: Seunghyun Suh, Gyeonggi-do (KR); Jinyoung Park, Seoul (KR)

(73) Assignee: DEAR U CO., LTD., Seoul (KR)

( * ) Notice: Subject to any disclaimer, the term of this patent is extended or adjusted under 35 U.S.C. 154(b) by 0 days.

(21) Appl. No.: 18/028,065

(22) PCT Filed: Oct. 6, 2021

(86) PCT No.: PCT/KR2021/013724
§ 371 (c)(1),
(2) Date: Mar. 23, 2023

(87) PCT Pub. No.: WO2022/080742
PCT Pub. Date: Apr. 21, 2022

(65) Prior Publication Data
US 2023/0275857 A1    Aug. 31, 2023

(30) Foreign Application Priority Data
Oct. 12, 2020   (KR) .......................... 10-2020-0130822

(51) Int. Cl.
*H04L 51/10* (2022.01)
*G06Q 50/00* (2024.01)
(Continued)

(52) U.S. Cl.
CPC ............. *H04L 51/10* (2013.01); *G06Q 50/01* (2013.01); *H04L 51/212* (2022.05); *G06V 20/50* (2022.01)

(58) Field of Classification Search
CPC ..... H04L 51/10; H04L 51/212; H04L 67/535; H04L 67/306; H04L 51/52; G06F 40/279;
(Continued)

(56) References Cited

U.S. PATENT DOCUMENTS 8,355,955 B1 *   1/2013  Mirchandani ...... G06Q 30/0255
                                                                    705/26.1
2009/0222348 A1 *  9/2009  Ransom ................. H04L 51/52
                                                                    705/14.49
(Continued)

FOREIGN PATENT DOCUMENTS

KR   10-2005-0011129 A    1/2005
KR   10-2008-0006955 A    1/2008
(Continued)

OTHER PUBLICATIONS

International Search Report for PCT/KR2021/013724 mailed on Jan. 11, 2022.
(Continued)

*Primary Examiner* — Ninos Donabed
(74) *Attorney, Agent, or Firm* — The PL Law Group, PLLC

(57) ABSTRACT

A personalized messaging service system according to an embodiment includes a user app installed on each of a plurality of user terminals, the user app configured to communicate with a central server through a network, an artist app installed on an artist terminal, the artist app configured to communicate with the central server through the network, and a central server configured for communicating with the user terminal and the artist terminal using the network.

11 Claims, 7 Drawing Sheets

(51) Int. Cl.
*G06V 20/50* (2022.01)
*H04L 51/212* (2022.01)

(58) Field of Classification Search
CPC ..... G06F 40/58; G06F 16/9535; G06Q 50/01; G06Q 30/0269; G06Q 50/10; G06Q 30/0201; G06Q 30/02; G06Q 10/10; G06V 20/50
See application file for complete search history.

(56) References Cited

U.S. PATENT DOCUMENTS

| | | | |
|---|---|---|---|
| 2010/0274815 A1* | 10/2010 | Vanasco | G06Q 30/02 707/798 |
| 2012/0150728 A1* | 6/2012 | Isaacson | G06Q 30/0226 705/39 |
| 2012/0150729 A1* | 6/2012 | Isaacson | G06Q 20/342 705/39 |
| 2012/0303710 A1* | 11/2012 | Roberts | G06Q 50/01 709/204 |
| 2013/0018960 A1* | 1/2013 | Knysz | G06Q 50/01 709/204 |
| 2013/0046781 A1* | 2/2013 | Frankel | G06Q 30/02 707/769 |
| 2013/0054010 A1* | 2/2013 | Holman | G06Q 50/01 700/232 |
| 2013/0054695 A1* | 2/2013 | Holman | G09B 19/00 709/204 |
| 2013/0290359 A1* | 10/2013 | Eronen | G06F 16/9535 707/E17.014 |
| 2014/0006517 A1* | 1/2014 | Hsiao | G06Q 50/01 709/205 |
| 2014/0184471 A1* | 7/2014 | Martynov | G06F 21/6209 345/1.2 |
| 2014/0195675 A1* | 7/2014 | Silver | H04L 65/611 709/224 |
| 2014/0223372 A1* | 8/2014 | Dostie | G06F 3/0482 715/813 |
| 2014/0359018 A1* | 12/2014 | Sun | H04L 65/403 709/204 |
| 2015/0058324 A1* | 2/2015 | Kauwe | G06F 16/9535 707/722 |
| 2015/0193457 A1* | 7/2015 | Radhakrishnan | G06F 16/22 707/812 |
| 2015/0264091 A1* | 9/2015 | Lin | H04L 67/12 709/228 |
| 2015/0264723 A1* | 9/2015 | Cheng | H04W 48/10 455/41.2 |
| 2015/0264731 A1* | 9/2015 | Lin | H04W 4/21 455/41.2 |
| 2016/0012465 A1* | 1/2016 | Sharp | G06Q 20/321 705/14.17 |
| 2023/0011621 A1* | 1/2023 | Jakobsson | H04L 9/3213 |

FOREIGN PATENT DOCUMENTS

| | | |
|---|---|---|
| KR | 10-2009-0000597 A | 1/2009 |
| KR | 10-2012-0137568 A | 12/2012 |
| KR | 10-2013-0089835 | 8/2013 |
| KR | 10-2085383 B1 | 3/2020 |

OTHER PUBLICATIONS

Office action issued on Apr. 14, 2021 from Korean Patent Office in a counterpart Korean Patent Application No. 10-2020-0130822 (all the cited references are listed in this IDS.) (English translation is also submitted herewith.).

Notice of Allowance issued on Aug. 13, 2021 from Korean Patent Office in a counterpart Korean Patent Application No. 10-2020-0130822 (all the cited references are listed in this IDS.) (English translation is also submitted herewith.).

* cited by examiner

STORE product detail screen

Artist selection screen

PERSONALIZED MESSAGING SERVICE SYSTEM, PERSONALIZED MESSAGING SERVICE METHOD, AND USER TERMINAL PROVIDED WITH THE PERSONALIZED MESSAGING SERVICE

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/013724 filed on Oct. 6, 2021, which claims priority to the benefit of Korean Patent Application No. 10-2020-0130822 filed in the Korean Intellectual Property Office on Oct. 12, 2020, the entire contents of which are incorporated herein by reference.

BACKGROUND

1. Technical Field

The present invention relates to a personalized messaging service system and a personalized messaging service method, and more particularly, it relates to a personalized messaging service system and a personalized messaging service method that converts messages created by artists into personalized messages for each user using user information and provides them.

2. Background Art

Instant Message Service (IMS) and Social Network Service (SNS) may exist in a method of transferring information between users using the Internet. Through the instant message service, users can not only send and receive messages as if having a 1:1 direct conversation, but also communicate with several people through a single chat window. The instant message server can provide not only a function of simply delivering a message, but also a function of transmitting an emoticon, flashcon, giftcon, etc. to the conversation partner through the messenger chat window or sending files.

A social network service is a service that allows users to form a personal network on the Internet, and allows them to share information related to a specific area of interest or activity. As a message service between individuals, instant message service such as KakaoTalk are widely used, and social network services such as Twitter and Instagram are widely used as channels for communicating with fans and celebrities such as celebrities and sports stars.

However, for instant message services such as KakaoTalk, a method of using a group chat room is initiated for one-to-many messaging. And in the case of Twitter or Instagram, messages posted by one celebrity are displayed equally to multiple users, so communication is only made in the way that multiple users read the same message.

SUMMARY

Accordingly, the technical problem of the present invention has been conceived in this respect, and an object of the present invention is to provide personalized messaging service system in which artists and users communicate through a private 1:1 chat room using personalized messages, breaking away from the existing one-to-many one-way communication and allowing users to feel a more intimate communication.

Another object of the present invention is to provide a personalized messaging service method through the messaging service system.

According to an exemplary embodiment of the inventive concept, a personalized messaging service system includes a user app that is installed on each of a plurality of user terminals and communicates with a central server through a network, an artist app installed on an artist terminal and communicating with the central server through the network, and a central server communicating with the user terminal and the artist terminal using the network. The artist app includes an artist login service unit providing a login service for an artist account, and an artist chat service unit receiving an artist message including an identification code. The central server or the user app generates a personalized message using the artist message and a user information. The user app includes a login service unit providing a login service for a user account, and a personalized chat service unit that displays the personalized message and receives a feedback message. The artist chat service unit displays the feedback message. The plurality of user terminals includes a first user terminal and a second user terminal. The user information of the user account logged into the first user terminal includes first nickname information. The user information of the user account logged into the second user terminal includes second nickname information. The identification code includes a nickname identification code. The nickname identification code of the artist message is replaced with the first nickname information to generate a first user personalized message, and is replaced with the second nickname information to generate a second user personalized message. The first user personalized message is displayed on the first user terminal, and the second user personalized message is displayed on the second user terminal. The first nickname information is input through the first user terminal and stored in user information of a first user account logged into the first user terminal. The second nickname information is input through the second user terminal and stored in user information of a second user account logged into the second user terminal.

In an embodiment of the present invention, the user information further includes any one or more of anniversary information previously stored in the user account, subscription date information, and location information recognized from the user terminal. The identification code of the artist message including the identification code is replaced with the user information to generate the personalized message.

In an embodiment of the present invention, the artist chat service unit receives an artist scheduled message including the identification code. The central server generates a personalized scheduled message using the artist scheduled message and the user information, and transmits the personalized scheduled message to the user app at a predetermined scheduled time, and the personalized chat service unit displays the personalized scheduled message at the predetermined scheduled time, or the artist chat service unit receives an artist event message including the identification code. The central server generates a personalized event message using the artist event message and the user information, and when a predetermined event occurs, transmits the personalized event message to the user app, so that the personalized chat service unit displays the personalized event message when the predetermined event occurs.

In an embodiment of the present invention, the artist message includes a first artist message and a second artist message different from the first artist message. The feedback message includes a plurality of first feedback messages written by a plurality of users at a time between the first artist message and the second artist message, and a plurality of second feedback messages written after the second artist message. In the artist app, the first feedback message is stored as an answer to the first artist message, and the second feedback message is stored as an answer to the second artist message.

In an embodiment of the present invention, the personalized chat service unit of the user app displays the feedback message along with an identification mark indicating whether the artist has read the feedback message. Even if the artist does not check the feedback message, the identification mark is changed to a read mark after a constant or random time elapses within a predetermined time range, or when the artist inputs a next artist message, the identification mark is changed to the read mark.

In an embodiment of the present invention, the user information includes a user language used by the user. When the artist message is written in a language other than a reference language, the artist message is translated into the reference language. The central server or the user app translates the reference language into the user language. A translation of the user language is performed through machine translation or artificial intelligence translation.

In an embodiment of the present invention, when the feedback message is transmitted to the artist app, the central server filters a message of inappropriate content and blocks a transmission of the feedback message to the artist app when the feedback message includes inappropriate content. When the feedback message includes text, a filtering of the central server is performed by comparing whether a preset prohibited word is included using a text recognition technology. When the feedback message includes an image or video, the filtering of the central server is performed by comparing whether the feedback message includes a preset prohibited image using an image or video recognition technology.

According to an exemplary embodiment of the inventive concept, a personalized messaging service method includes a user login step in which each user logs in to a user account using a user app installed on each user terminal, a user information verification step to check pre-input user information, an artist message creation step of creating an artist message including an identification code using an artist app installed on an artist terminal, a personalized message generation step of generating a personalized message by substituting the identification code of the artist message with corresponding user information, a personalized message display step of displaying the personalized message on the user terminal, a feedback message creation step in which the user writes a feedback message for the personalized message, and a feedback message display step of displaying the feedback message on the artist terminal. The user terminals include a first user terminal and a second user terminal. The user information of the user account logged into the first user terminal includes a first nickname information. The user information of the user account logged into the second user terminal includes a second nickname information. The identification code includes a nickname identification code. The nickname identification code of the artist message is replaced with the first nickname information to generate a first user personalized message from the artist message, and is replaced with the second nickname information to generate a second user personalized message from the artist message. The first user personalized message is displayed on the first user terminal, and the second user personalized message is displayed on the second user terminal. The first nickname information is input through the first user terminal and stored in user information of a first user account logged into the first user terminal. The second nickname information is input through the second user terminal and stored in user information of a second user account logged into the second user terminal.

In an embodiment of the present invention, the user information further includes any one or more of anniversary information previously stored in the user account, subscription date information, and location information recognized from the user terminal.

In an embodiment of the present invention, the identification code further includes an anniversary identification code, a subscription date identification code, and a location information identification code. The nickname identification code of the artist message is replaced with the nickname, the anniversary identification code is replaced with the anniversary, the subscription date identification code is replaced with the subscription date, and the location information identification code of the artist message are replaced with the location information to generate the personalized message.

In an embodiment of the present invention, in the artist message creation step, an artist scheduled message including the identification code is input or an artist event message including the identification code is input. In the generating of the personalized message, a personalized scheduled message is generated using the artist scheduled message and the user information, or a personalized event message is generated using the artist event message and the user information. In the step of displaying the personalized message, the personalized scheduled message is displayed on the user app at a predetermined scheduled time, or the personalized event message is displayed on the user app when a predetermined event occurs.

In an embodiment of the present invention, the user information includes a user language which is used by the user. When the artist message is written in a language other than the reference language, the artist message is translated into the preset reference language. In the step of displaying the personalized message, the reference language is translated into the user language, and a translated personalized message is displayed, and a translation of the user language is performed through machine translation or artificial intelligence translation.

In an embodiment of the present invention, the displaying of the feedback message includes a filtering step of blocking the display of the feedback message when the feedback message includes predetermined inappropriate content. In the filtering step, when the feedback message includes text, text recognition technology is used to compare whether a preset prohibited word is included. When the feedback message includes an image or video, a filtering of the feedback message is performed by comparing whether the feedback message includes a preset prohibited image.

According to the exemplary embodiments of the present invention, the personalized messaging service system can create artist messages through the artist app, convert it into a personalized message suitable for each of a plurality of users using personalization information of each of a plurality of users, and then display it on the user app. Accordingly, by communicating through a private 1:1 chat room using personalized messages between artists and users, it is possible to break away from the existing one-to-many one-way communication and provide a service in which users feel a more intimate communication. In particular, since a small number of artists can efficiently provide a 1:1 chat service with a large number of users, a new communication system can be provided based on intimate communication between celebrities and fans.

However, the effects of the present invention are not limited to the above effects and may be variously expanded without departing from the spirit and scope of the present invention.

DETAILED DESCRIPTION

Figure 1:
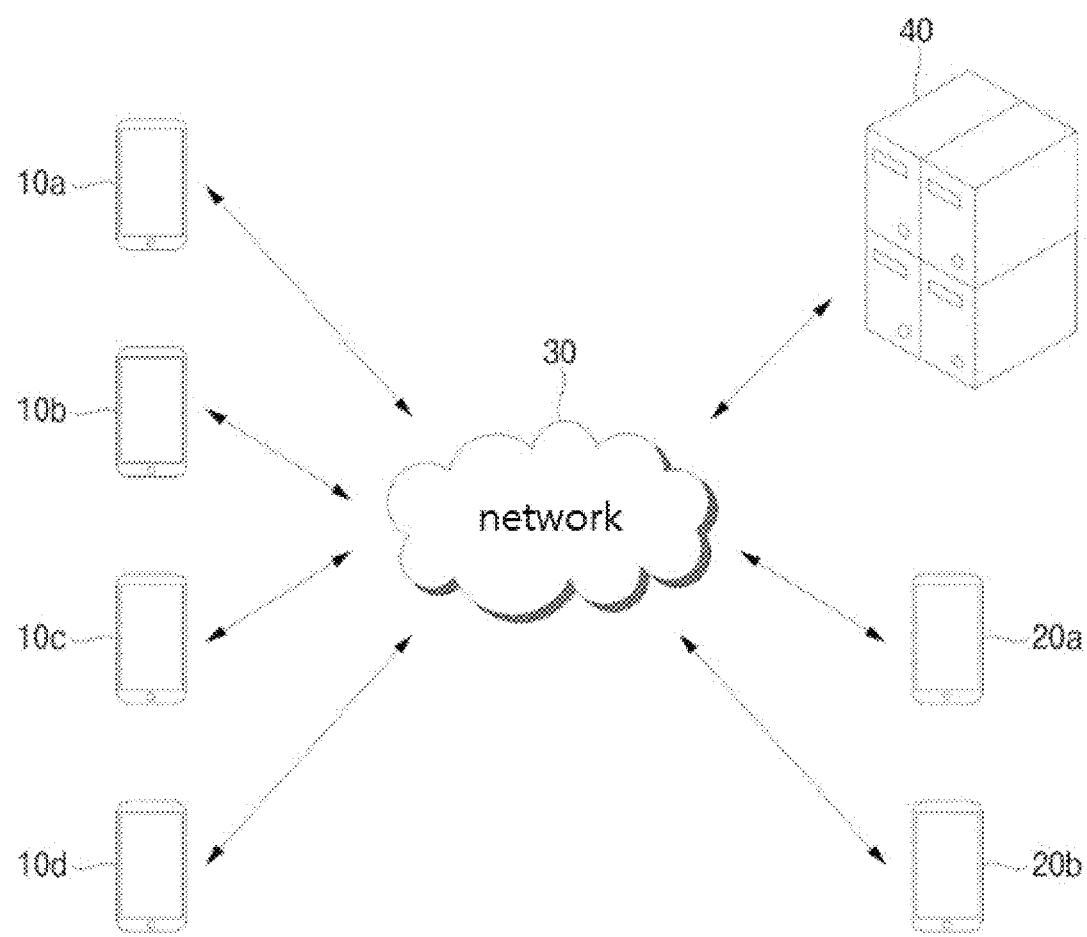
FIG. 1 is a diagram illustrating a personalized messaging service system according to an embodiment of the present invention.

Hereinafter, exemplary embodiments of the present invention will be described in more detail with reference to the drawings.

Since the present invention may have various changes and have various forms, specific exemplary embodiments are illustrated in the drawings and described in detail in the text. However, it is not intended to limit the present invention to the specific disclosed form, and it will be appreciated that the present invention includes all modifications, equivalences, or substitutions included in the spirit and the technical scope of the present invention.

FIG. 1 is a diagram illustrating a personalized messaging service system according to an embodiment of the present invention.

Referring to FIG. 1, the personalized messaging service system may include a plurality of user terminals 10a, 10b, 10c, and 10d, one or more artist terminals 20a and 20b, a network 30, and a central server 40.

The user terminals 10a, 10b, 10c, and 10d may include a first user terminal 10a, a second user terminal 10b, a third user terminal 10c, and a fourth user terminal 10d.

The first to fourth user terminals 10a, 10b, 10c, and 10d may be smart devices used by first to fourth users, respectively, that are different users. Here, the smart device is a computer, or a portable terminal owned by each user. And each user may receive a personalized messaging service by communicating with the central server 40 through the network 30 in the form of a web, an application, or a web app through the user terminals 10a, 10b, 10c, and 10d. Here, the personalized message is a message delivered by one artist to a plurality of users. And the personalized message is a personalized message in which at least some terms are modified to include the user information by using each user's unique user information. That is, according to the user information, at least a portion of the first personalized message delivered to the first user and the second personalized message delivered to the second user may be different from each other.

On the other hand, the computer may include, for example, a desktop (desktop), a laptop (laptop), a tablet PC (Tablet PC), etc. with a web browser (WEB Browser). The portable terminal is a wireless communication device that ensures portability and mobility. For example, the portable terminal may include all kinds of handheld-based wireless communication devices such as a smartphone, a personal communication system (PCS), a global system for mobile communication (GSM), a personal digital cellular (PDC), and a PHS (Personal Handyphone System), PDA (Personal Digital Assistant), IMT (International Mobile Telecommunication)-2000, CDMA (Code Division Multiple Access)-2000, W-CDMA (W-Code Division Multiple Access), Wibro (Wireless Broadband Internet) terminal, etc.

A user app may be installed in each of the user terminals 10a, 10b, 10c, and 10d. Through the user app, the first to fourth users may use a personalized messaging service with a desired artist. A detailed description of the user app will be described later in the description of FIG. 2.

The user terminals 10a, 10b, 10c, and 10d are configured to access the central server 40 through the network 30 and transmit/receive data according to a command of the user app.

Here, the network 30 may be implemented using a mobile communication network. And the mobile communication network may include, but is not limited to, a wide area network (WAN), a personal area network (PAN), 3G, 4G, LTE, 5G, and Wi-Fi.

The artist terminals 20a and 20b may include a first artist terminal 20a and a second artist terminal 20b. The artist terminals 20a and 20b may be smart devices used by different artists, a first artist and a second artist, respectively.

An artist app may be installed in each of the artist terminals 20a and 20b. Through the artist app, the first and second artists may use an artist messaging service with a plurality of users who select them. A detailed description of the artist app will be described later in the description of FIG. 2.

The artist terminals 20a and 20b are configured to access the central server 40 through the network 30 and transmit/receive data according to a command of the artist app.

The central server 40 may generate a personalized message using the artist message received from the artist terminals 20a and 20b and user information previously input through the user terminals 10a, 10b, 10c and 10d. In particular, the artist message may include an identification code. And the identification code may be replaced with the user information to generate the personalized message. Accordingly, each of the plurality of fan users can use a 1:1 chat service from an artist such as a singer or actor by the personalized message generated for each of the plurality of fan users.

On the other hand, the artist terminals 20a, and 20b and user terminals 10a, 10b, 10c, and 10d are not distinguished from each other and may be implemented in the same smart device. For example, not only an artist app but also a user app may be installed in the artist terminal, and a single app may be programmed to implement both an artist app and a user app according to a login account.

In this embodiment, the creation of the personalized message has been described as being performed in the central server 40, but is not limited thereto. For example, the personalized message may be generated in the user terminals 10a, 10b, 10c, and 10d instead of the central server 40. And if necessary, the creation of the personalized message may be performed in both the central server 40 and the user terminals 10a, 10b, 10c, and 10d.

Figure 2:
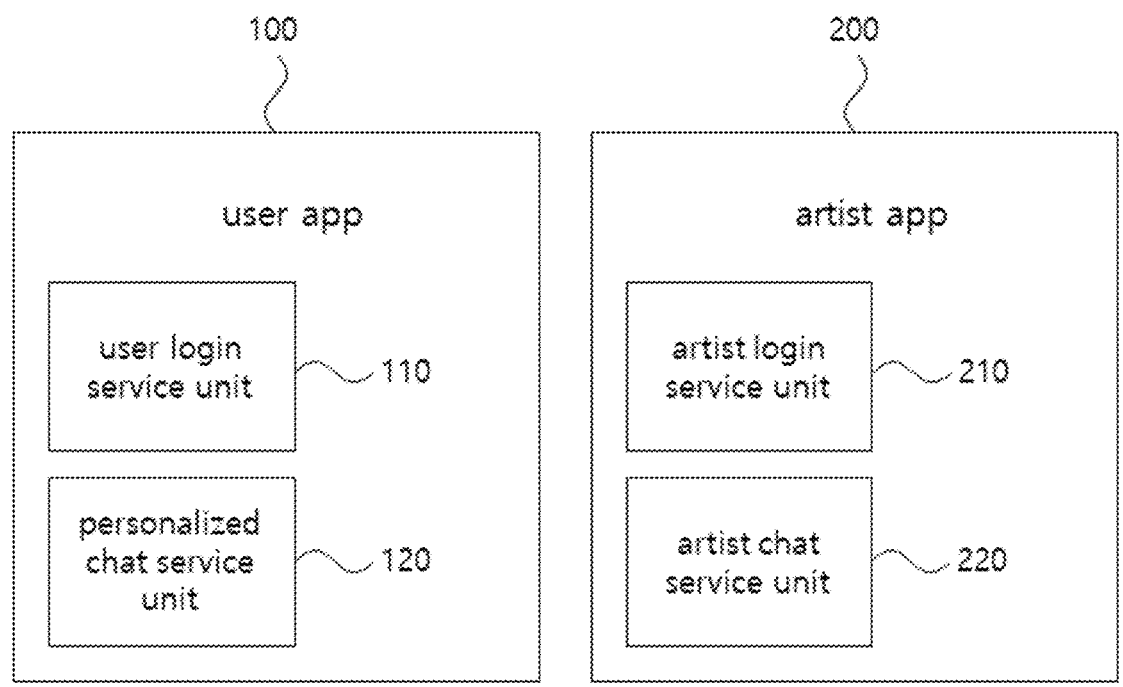
FIG. 2 is a block diagram illustrating a user app implemented in a user terminal and an artist app implemented in an artist terminal of a personalized messaging service system according to an embodiment of the present invention.

FIG. 2 is a block diagram illustrating a user app implemented in a user terminal and an artist app implemented in an artist terminal of a personalized messaging service system according to an embodiment of the present invention.

Referring to FIGS. 1 and 2, the user app 100 may log in to a user account and perform a personalized chat service function with an artist by being installed in the user terminal and communicating with the central server through the network.

The user app 100 may include a user login service unit 110 that provides a user login service for a user account. And the user app 100 may include a personalized chat service unit 120 that displays the personalized message and receives a feedback message.

After logging in to the user account, the user may proceed with payment to use the service. The payment is provided in the form of a periodic payment service. For example, the payment is provided as a monthly subscription-type auto-renewal product, so that continuous purchase and service maintenance can be encouraged.

Pre-input user information may be stored in the user account. For example, the user information may be a nickname, anniversary information, subscription date information, and the like previously stored in the user account. Also, the user information may include location information recognized from the user terminal.

The nickname is a term used by an artist to refer to a user, and can be set by the user through the user app 100. The anniversary information is, for example, a date that the artist wishes to commemorate the user's anniversary, such as the user's birthday. And the anniversary information may be set by the user through the user app 100. The subscription date information is the date when the user starts payment for service use. And the subscription date information may be used to display the date of subscription to the corresponding artist.

In addition, the subscription date information can be used as a criterion for limiting or expanding the contents of the user's service. For example, through the subscription date information, when the date of subscription to the artist exceeds a certain date, the number of characters in the text of the reply message sent by the user to the artist may be increased (e.g., increased from the initial 30 characters to 50 characters). Or a differentiated service such as allowing a photo to be attached to the reply message may be provided.

In this embodiment, the user information is exemplified by nickname, anniversary information, the subscription date information, location information, etc., but is not limited thereto. And the user information may include personalized data of users that can be used to form a personalized message. For example, personalized data such as the user's language, blood type, and payment information may be further included in the user information.

The personalized chat service unit 120 may receive and display a personalized message generated based on an artist message sent by an artist, and may receive a feedback message that is a message sent from the user to the artist.

The artist app 200 may perform an artist chat service function of logging into an artist account and sending and receiving messages to users who are a large number of fans by being installed in the artist terminal and communicating with the central server through a network.

The artist app 200 may include an artist login service unit 210 that provides an artist account login service and an artist chat service unit 220 that receives an artist message including an identification code.

Artists can use the service after logging in to their artist account.

The artist chat service unit 220 may receive an artist message to be transmitted to a plurality of users, and receive and display the feedback message from the plurality of users.

Meanwhile, the artist may transmit a scheduled message using the artist app 200. The central server 40 may generate a personalized scheduled message using the artist scheduled message and the user information, and transmit the personalized scheduled message to the user app 100 at a predetermined scheduled time. And the personalized chat service unit 120 may display the personalized scheduled message at the predetermined scheduled time.

In addition, the artist chat service unit 220 receives an artist event message including the identification code, and the central server 40 may generate a personalized event message using the artist event message and the user information. When a predetermined event occurs, the personalized event message is transmitted to the user app 100, and the personalized chat service unit 120 may display the personalized event message when the predetermined event occurs.

For example, a specific time of the user's birthday included in the user information can be set as a scheduled time, and an artist scheduled message containing a birthday message including an identification code may be converted into a personalized scheduled message, and can transmit to the user app 100 at the scheduled time. Or by the payment information included in the user information, an artist event message containing an artist subscription thank-you message including an identification code may be converted into a personalized event message, and may be transmitted to the user app 100 when a user pays for a monthly subscription (event occurs).

Through this, a large number of fans can experience a private 1:1 chat room chatting with the artist. And the artist can efficiently provide services to a large number of fans. In particular, since artist apps and user apps are easily implemented through terminals such as smartphones, it is possible to access services easily and quickly regardless of location and time. So it can satisfy the needs of users as fans who want quick information about the artist and real-time status of the artist.

Meanwhile, the user information may include a user language used by the user. When the artist message is written in a language other than the reference language, the artist message is translated into the preset reference language. And the central server 40 or the user app 100 may translate the reference language into the user language. And the translation of the user language may be performed through machine translation or artificial intelligence translation.

In addition, in transmitting the feedback message to the artist app 200, the central server 40 filters messages with inappropriate content, and when the feedback message includes inappropriate content, transmission of the feedback message to the artist app 200 may be blocked.

When the feedback message includes text, a filtering of the central server 40 may use text recognition technology to compare whether preset prohibited words are included. And when the feedback message includes an image or video, the filtering may be performed to compare whether or not a preset prohibited image is included using an image or image recognition technology.

Figure 3:
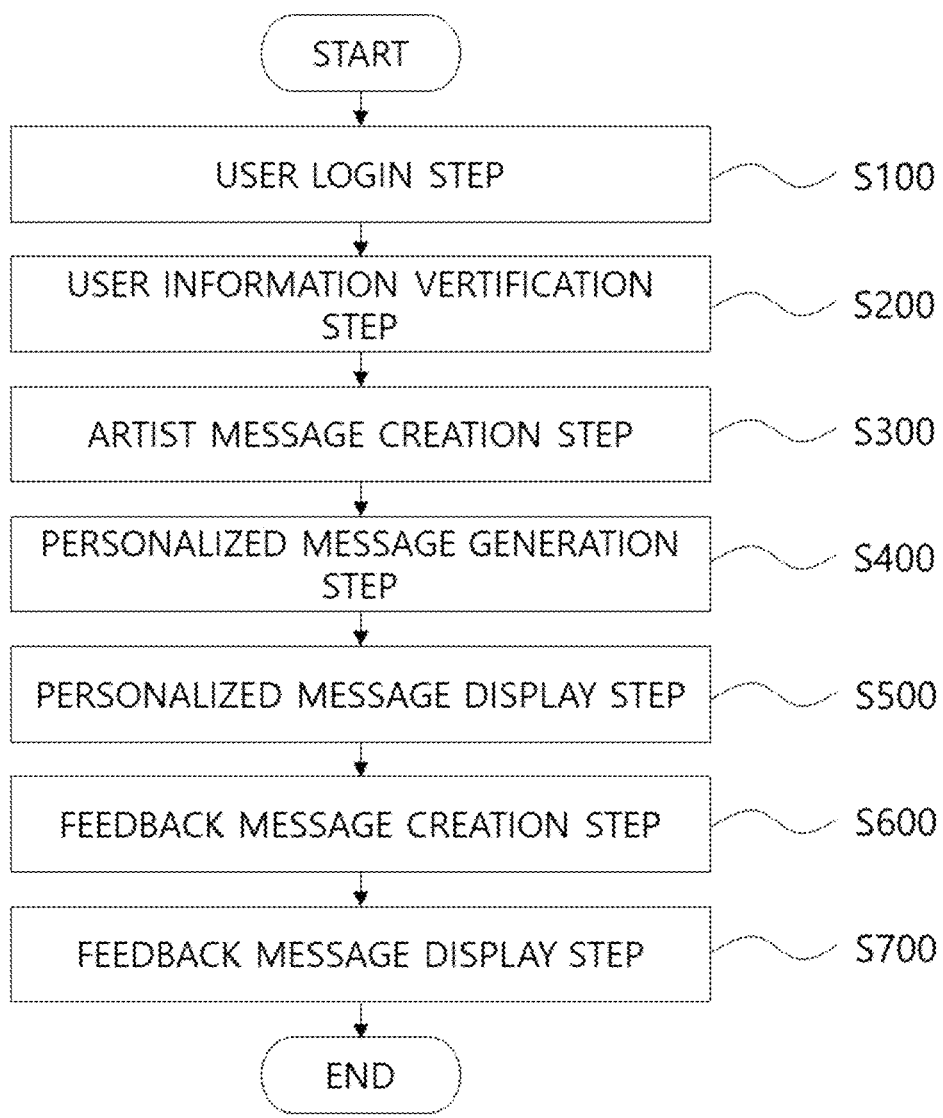
FIG. 3 is a diagram illustrating a personalized messaging service method according to an embodiment of the present invention.

FIG. 3 is a diagram illustrating a personalized messaging service method according to an embodiment of the present invention.

Referring to FIGS. 1 to 3, the personalized messaging service method includes a user login step in which a plurality of users log in using each user terminal S100, a user information verification step to verify user information S200, an artist message creation step in which the artist writes a message using the artist terminal S300, a personalized message generation step of generating a personalized message for each of a plurality of users S400, a step of displaying each personalized message on a user terminal of each of a plurality of users S500, a feedback message creation step in which each of a plurality of users creates a feedback message using a user terminal S600, and a feedback message display step of receiving a plurality of feedback messages and displaying them on the artist terminal S700.

In the user login step S100, the user may access the central server 40 through the user app 100 of the user terminal and perform a new subscription or login. In addition, the user may input user information through the user app 100 and store it in the central server 40.

After installing the user app on the user terminal, the user can access the service page by entering personal information and logging in. After selecting a desired artist group (see FIGS. 4A and 4B), the user can use the service by paying for the subscription for the number of people desired to subscribe. The service can be provided as a monthly subscription-type auto-renewal product that encourages continuous purchase and service maintenance.

Meanwhile, the user may input user information through the user app 100. The user information may include a nickname, anniversary information, subscription date information previously stored in the user account, and location information recognized from the user terminal.

In the user information verification step S200, the previously input user information of the logged in user is checked. At this time, if there is an input value that has not been input, the user may be requested to input or necessary user information may be obtained from the user terminal.

In the artist message creation step S300, the artist may create an artist message including an identification code using an artist app installed in the artist terminal. In this case, the identification code may include a nickname identification code, an anniversary identification code, a subscription date identification code, and a location information identification code. In addition, the artist app may provide an artist self-inspection screen so that the artist can review the written message before sending the artist message.

In the personalized message generation step S400, the personalized message may be generated by replacing the identification code of the artist message with corresponding user information.

The nickname identification code of the artist message may be replaced with the nickname to generate the personalized message. And the anniversary identification code may be replaced with the anniversary to generate the personalized message. And the subscription date identification code may be replaced with the subscription date information to generate the personalized message. The location information identification code may be replaced with the location information to generate the personalized message.

For example, when an artist writes @@@ in the text of an artist message, in the 1:1 chat room of a user who is a subscriber, the nickname of the subscriber is replaced and displayed. (Example: If the preset nickname is 'Jinyoung', @@@ What are you doing?→Jinyoung what are you doing?) Meanwhile, in the case of a postposition adjacent to the identification code, it may be automatically changed to an appropriate postposition, added or deleted according to the type of consonant at the last letter of substituted user information. In this case, a postposition that is immediately input without spacing after the identification code of the artist message is recognized as the adjacent postposition, and it may be changed to an appropriate postposition, added or deleted. (Example: If the preset nickname is 'Jinyoung', @@@ what are you doing?→Jinyoung, what are you doing?)

Also, the artist app may receive an artist scheduled message or an artist event message. Then, when a personalized scheduled message or personalized event message is created by using this and a predetermined scheduled time or event occurs, the personalized scheduled message or personalized event message may be displayed through the user app. For example, it is possible to reserve and send a message on a special anniversary, and it is possible to send a message according to a specific date such as Christmas or Valentine's Day or a user's birthday.

In addition, based on information about the user language used by the user, a message transmitted by the artist may be translated into the language used by the user and provided. For example, the user information includes a user language used by the user, and when the artist message is written in a language other than the reference language, it may be translated into the preset reference language. The translated personalized message may be generated by translating the reference language into the user language. In this case, the translation of the user language may be performed through machine translation or artificial intelligence translation, and various known machine translation or artificial intelligence translation systems may be utilized.

In the personalized message display step S500, each personalized message may be displayed on a user terminal of each of a plurality of users. For example, the user terminals may include a first user terminal and a second user terminal. And user information of a user account logged into the first user terminal may include first user information. And user information of a user account logged into the second user terminal may include second user information. The identification code of the artist message may be substituted with the first user information to generate a personalized first user message from the artist message. And the identification code may be substituted with the second user information to generate a second user personalized message from the artist message. The first user personalized message may be displayed on the first user terminal, and the second user personalized message may be displayed on the second user terminal.

In the feedback message creation step S600, each of a plurality of users may create a feedback message using a user terminal. That is, the user receiving the personalized message may write a feedback message as a reply message to the artist.

In addition, the user app may display the received feedback message together with an identification mark indicating whether the artist has read the feedback message. In the feedback message, even if the artist does not check the corresponding feedback message, the identification mark may be changed to a read mark after a constant or random time elapses within a predetermined time range. When the artist inputs the next artist message, the identification mark may be changed to a read mark. Through this, the user can recognize that the artist has confirmed his or her feedback message.

In the feedback message display step S700, a plurality of feedback messages may be received and displayed on the artist terminal. Through this, artists can check messages sent by users. And in order to efficiently manage them, by storing the feedback messages for each message sent by the artist, the artist can easily find feedback messages for a specific artist message when the artist needs it.

Meanwhile, before displaying the feedback message in the artist app, messages with inappropriate content may be filtered, and transmission of the feedback message to the artist app may be blocked if the feedback message includes inappropriate content. In the filtering, when the feedback message includes text, by using text recognition technology, it is possible to compare whether preset prohibited words are included. If the feedback message includes an image or video, it may be compared whether the feedback message includes a preset prohibited image using image or video recognition technology.

In addition, an account of a user who sends a filtering target feedback message more than a specified number of times may be designated as a black account, and subsequent transmission of the feedback message may be completely blocked.

The feedback messages may be stored in chronological order in the artist app, or may be arranged according to preset priorities and displayed to the artist. For example, by sorting in the order of loyal users with a large number of subscriptions, the artist may check the feedback messages of the highly loyal users first.

Figure 4A:
FIGS. 4A and 4B are an exemplary view of a user interface (UI) of a user app of a personalized messaging service method according to an embodiment of the present invention.
Figure 4B:
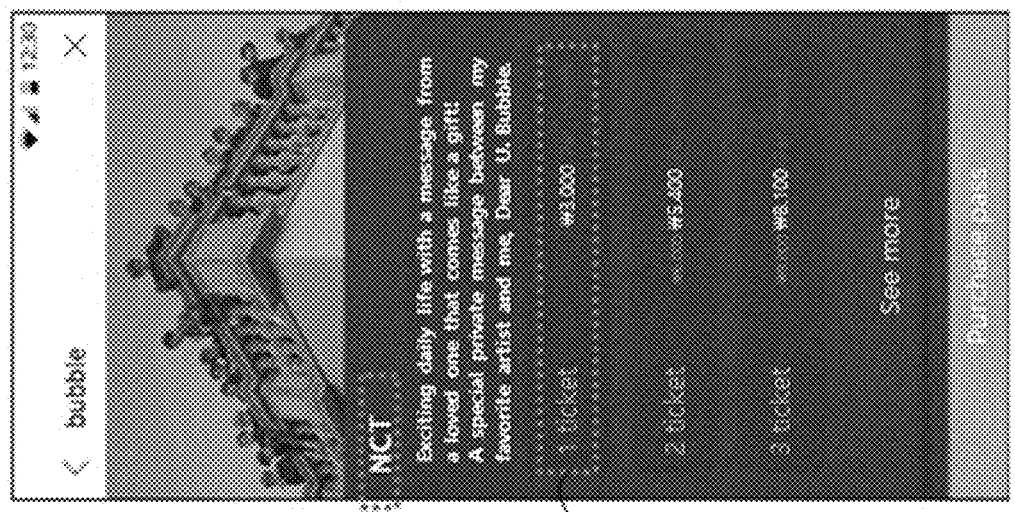

FIGS. 4A and 4B are an exemplary view of a user interface (UI) of a user app of a personalized messaging service method according to an embodiment of the present invention.

Referring to FIG. 4A, an example of a product detail screen of STORE is shown. When an artist is selected, a payment button for the corresponding artist is displayed, so that the user can pay for the number of artists he/she wants to subscribe to on a monthly basis.

Referring to FIG. 4B, an example of an artist selection screen is shown. On the artist selection screen, the user can select a desired artist and display subscribed artists separately.

Figure 5:
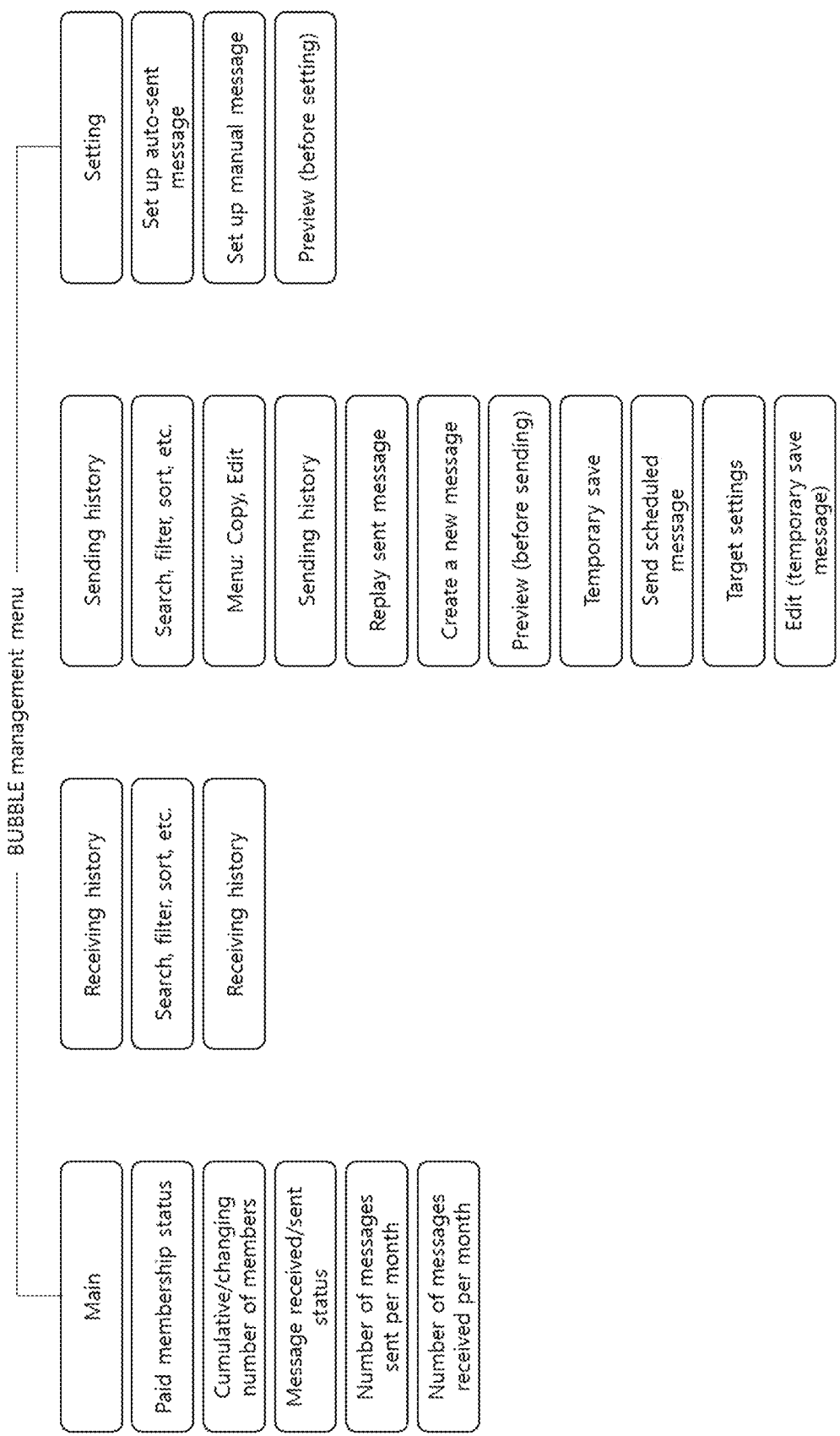
FIG. 5 is a diagram for explaining a management menu of an artist app of a personalized messaging service method according to an embodiment of the present invention.

FIG. 5 is a diagram for explaining a management menu of an artist app of a personalized messaging service method according to an embodiment of the present invention.

Referring to FIG. 5, an artist may utilize various application menus for user management. In the 'Main' management menu, the status of paid members, the number of cumulative/changing members, the status of receiving/sending messages, the number of messages sent per month, and the number of messages received per month can be viewed, and managed. In the 'Receipt history' management menu, search, filter, sorting, and reception history can be viewed, set, and managed. In the 'Sending history' management menu, search, filter sorting, etc. Menu: copy, edit, sending history, replay sent message, write new message, preview (before sending), save temporarily, scheduled send, target setting, edit (temporarily stored messages), etc. can be viewed, set, and managed. In the 'Settings' management menu, automatic transmission message settings, manual message settings, and preview (before setting) can be set and viewed. These management menus are for using and utilizing services using the artist app, and the content described in FIG. 5 is an example of the management menu of the artist app, but is not limited thereto, and various necessary functions may be added or removed.

Figure 6B:
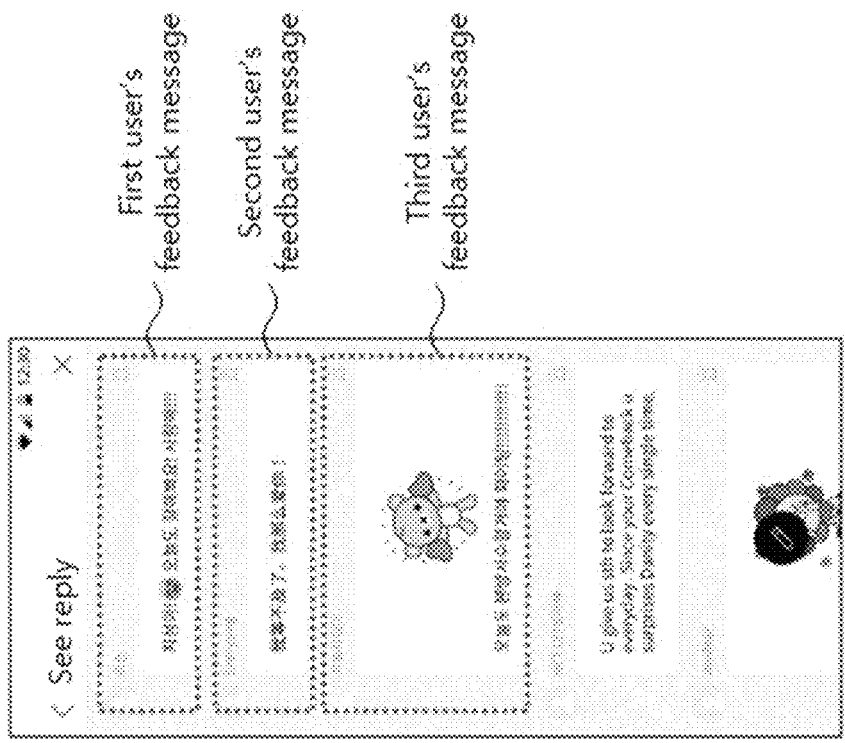
FIGS. 6A and 6B are an exemplary view of a user interface (UI) of an artist app of a personalized messaging service method according to an embodiment of the present invention.
Figure 6A:
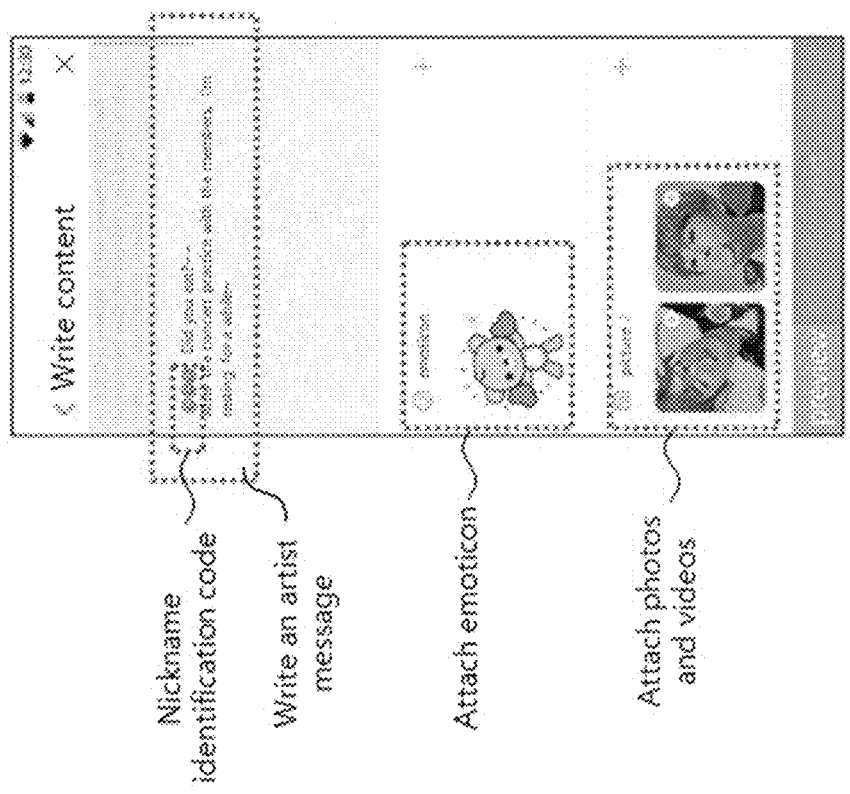

FIGS. 6A and 6B are an exemplary view of a user interface (UI) of an artist app of a personalized messaging service method according to an embodiment of the present invention.

Referring to FIG. 6A, the artist may create an artist message including an identification code in the content creation message window. In the drawing, an artist message is created including the nickname identification code 'AAA', and the nickname identification code is replaced with the user's nickname and displayed in the user chatting window.

The artist message may be created by attaching not only text, but also media such as emoticons, photos, and videos.

Referring to FIG. 6B, feedback messages sent by users are stored in the reply box of the artist app, and feedback messages sent by a plurality of users can be checked through the view reply management menu. In the drawing, feedback messages sent by a plurality of users are arranged and displayed in chronological order, the feedback messages may include text and/or emoticons, and may be displayed in various languages.

Figure 7A:
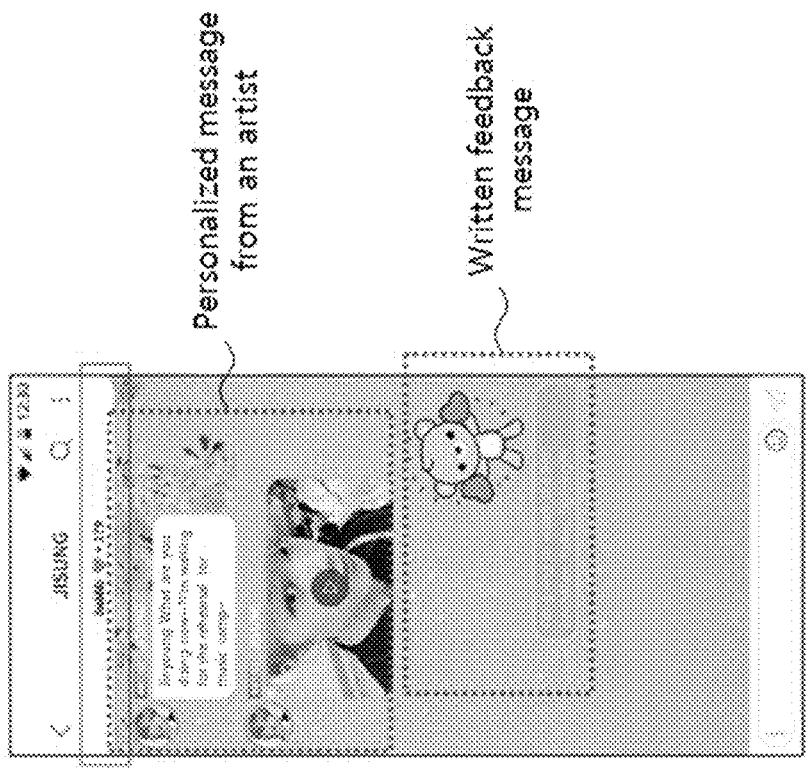
FIGS. 7A and 7B are an exemplary view of a user interface (UI) of a user app of a personalized messaging service method according to an embodiment of the present invention.
Figure 7B:
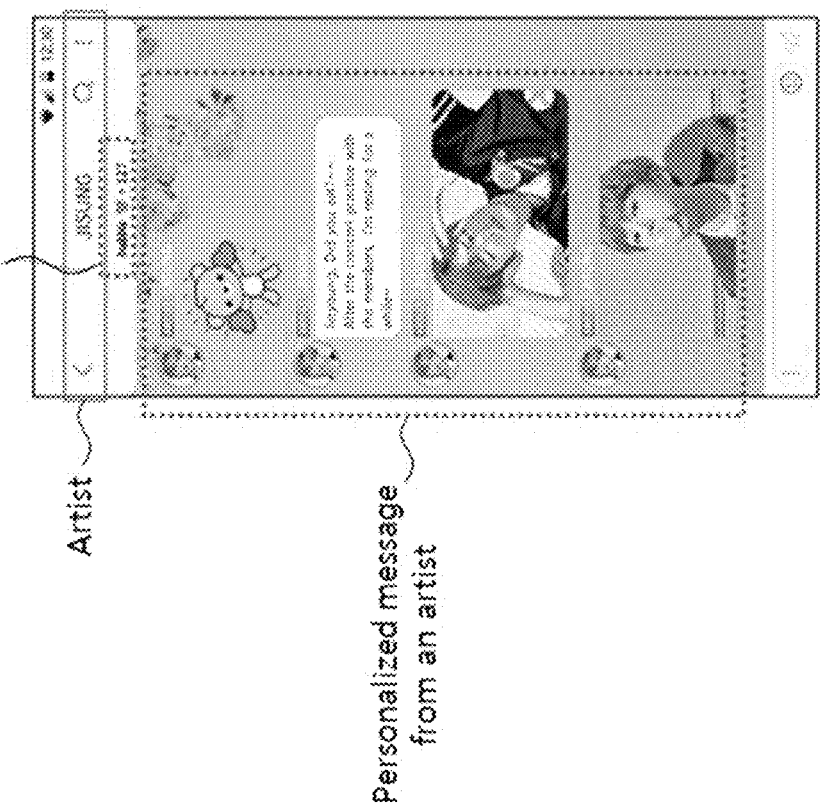

FIGS. 7A and 7B are an exemplary view of a user interface (UI) of a user app of a personalized messaging service method according to an embodiment of the present invention.

Referring to FIG. 7A, an example of a 1:1 chat room screen of a user who is a subscriber is displayed. The subscriber can check the artist he or she has subscribed to, and the number of days the subscriber has subscribed to the corresponding artist can be displayed using subscription date information. A personalized message may be displayed on the 1:1 chat room screen.

Referring to FIG. 7B, on the subscriber's 1:1 chat room screen, the subscriber can send a feedback message to the artist, and it is displayed in the form of a 1:1 chat room, so users can feel the feeling of directly communicating with the artist through a private 1:1 chat room, so that high satisfaction with the service can be obtained.

According to embodiments of the present invention, the personalized messaging service system may create an artist message through an artist app, convert it into a personalized message suitable for each of a plurality of users by using personalization information of each of a plurality of users, and then it can displayed on the user app. Accordingly, the artist and the user communicate through a private 1:1 chat room using personalized messages, breaking away from the existing one-to-many one-way communication, and it is possible to provide a service in which users feel a more intimate communication. In particular, since a small number of artists can efficiently provide a 1:1 chat service with a large number of users, a new communication system can be provided based on intimate communication between celebrities and fans.

Although the present invention has been described with reference to the above exemplary embodiments, it will be understood by those skilled in the art that various modifications and changes may be made to the present invention without departing from the spirit and scope of the present invention as set forth in the claims below.

What is claimed is:

1. A personalized messaging service system comprising:
a user application installed on each of a plurality of user terminals, the user application configured to communicate with a central server through a network by the plurality of user terminals, respectively;
an artist application installed on an artist terminal, the artist application configured to communicate with the central server through the network by the artist terminal; and
a central server configured for communicating with the user terminal and the artist terminal using the network, and
wherein the artist application comprises:
  an artist login service processor configured for providing a login service for an artist account on the artist terminal; and
  an artist chat service processor configured for receiving an artist message including an identification code on the artist terminal, and
wherein the central server or the user application is configured to generate a personalized message using the artist message and a user information, and
wherein the user application comprises:
  a login service processor providing a login service for a user account on the user terminal; and
  a personalized chat service processor that displays the personalized message and receives a feedback message on the user terminal, and
wherein the artist chat service processor is configured to display the feedback message,
wherein the plurality of user terminals comprises a first user terminal and a second user terminal,
wherein the user information of the user account logged into the first user terminal comprises first nickname information,
wherein the user information of the user account logged into the second user terminal comprises second nickname information,
wherein the identification code comprises a nickname identification code, and
wherein the nickname identification code of the artist message is configured to be replaced with the first nickname information to generate a first user personalized message by the central sever or by the first user terminal, and is configured to be replaced with the second nickname information to generate a second user personalized message by the central sever or by the second user terminal,
the first user personalized message is configured to be displayed only on the first user terminal, and the second user personalized message is configured to be displayed only on the second user terminal,
the first nickname information is configured to be input through the first user terminal and stored in user information of a first user account logged into the first user terminal, and
the second nickname information is configured to be input through the second user terminal and stored in user information of a second user account logged into the second user terminal, wherein, when the feedback message is transmitted to the artist application, the central server is configured to filter a message of inappropriate content and block a transmission of the feedback message to the artist application when the feedback message comprises inappropriate content, and
wherein when the feedback message includes text, a filtering of the central server is configured to be performed by comparing whether a preset prohibited word is included using a text recognition technology, and
the filtering of the central server is configured to be performed by comparing whether the feedback message comprises a preset prohibited image using an image or video recognition technology.

2. The personalized messaging service system of claim 1, wherein the user information further comprises any one or more of anniversary information previously stored in the user account, subscription date information, and location information recognized from the user terminal, and
wherein the identification code of the artist message comprising the identification code is replaced with the user information to generate the personalized message.

3. The personalized messaging service system of claim 1, wherein the artist chat service processor is configured to receive an artist scheduled message comprising the identification code, and
wherein the central server is configured to generate a personalized scheduled message using the artist scheduled message and the user information, and is configured to transmit the personalized scheduled message to the user application at a predetermined scheduled time, and
the personalized chat service processor is configured to display the personalized scheduled message at the predetermined scheduled time, or the artist chat service processor is configured to receive an artist event message comprising the identification code,
wherein the central server is configured to generate a personalized event message using the artist event message and the user information, and when a predetermined event occurs, the central server is configured to transmit the personalized event message to the user application, so that the personalized chat service processor displays the personalized event message when the predetermined event occurs.

4. The personalized messaging service system of claim 1, wherein the artist message comprises a first artist message and a second artist message different from the first artist message, and
wherein the feedback message comprises a plurality of first feedback messages written by a plurality of users at a time between the first artist message and the second artist message, and a plurality of second feedback messages written after the second artist message, and
wherein, in the artist application, the first feedback message is stored as an answer to the first artist message, and the second feedback message is stored as an answer to the second artist message.

5. The personalized messaging service system of claim 1, wherein the personalized chat service processor of the user application is configured to display the feedback message along with an identification mark indicating whether the artist has read the feedback message, and
even if the artist does not check the feedback message, the identification mark is changed to a read mark after a constant or random time elapses within a predetermined time range, or when the artist inputs a next artist message, the identification mark is changed to the read mark.

6. The personalized messaging service system of claim 1, wherein the user information comprises a user language used by the user, and when the artist message is written in a language other than a reference language, the artist message is configured to be translated into the reference language, and the central server or the user application is configured to translates the reference language into the user language, and a translation of the user language is configured to be performed through machine translation or artificial intelligence translation.

7. A personalized messaging service method comprising:

a user login step in which each user logs in to a user account using a user application installed on user terminals comprising a first user terminal and a second user terminal;

a user information verification step, using the user terminal, to check pre-input user information, wherein the user information of the user account logged into the first user terminal comprises a first nickname information, and the user information of the user account logged into the second user terminal comprises a second nickname information wherein the first nickname information is input through the first user terminal and stored in the user information of a first user account logged into the first user terminal, and the second nickname information is input through the second user terminal and stored in the user information of a second user account logged into the second user terminal;

an artist message creation step of creating an artist message comprising an identification code using an artist application installed on an artist terminal;

a personalized message generation step, using a central server or the artist terminal, of generating a personalized message by substituting the identification code of the artist message with corresponding user information, the identification code comprising a nickname identification code, wherein the generating of the personalized message comprises:

generating a first user personalized message from the artist message by the central sever or by the first user terminal by substituting the first nickname information with the nickname identification code of the artist message; and generating a second user personalized message from the artist message by the central sever or by the second user terminal by substituting the second nickname information with the nickname identification code of the artist message;

a personalized message display step of displaying the first user personalized message only on the first user terminal and the second user personalized message only on the second user terminal;

a feedback message creation step, using the user terminal, in which the user writes a feedback message for the personalized message; and a feedback message display step of displaying the feedback message on the artist terminal;

wherein the displaying of the feedback message comprises a filtering step of blocking the display of the feedback message when the feedback message includes predetermined inappropriate content, wherein in the filtering step, when the feedback message includes text, text recognition technology is used to compare whether a preset prohibited word is included, and a filtering of the feedback message is performed by comparing whether the feedback message includes a preset prohibited image.

8. The personalized messaging service method of claim 7, wherein the user information further comprises any one or more of anniversary information previously stored in the user account, subscription date information, and location information recognized from the user terminal.

9. The personalized messaging service method of claim 8, wherein the identification code further comprises an anniversary identification code, a subscription date identification code, and a location information identification code, and wherein the nickname identification code of the artist message is replaced with the nickname, the anniversary identification code is replaced with the anniversary, the subscription date identification code is replaced with the subscription date, and the location information identification code of the artist message are replaced with the location information to generate the personalized message.

10. The personalized messaging service method of claim 7, wherein in the artist message creation step, an artist scheduled message comprising the identification code is input or an artist event message comprising the identification code is input, wherein in the generating of the personalized message, a personalized scheduled message is generated using the artist scheduled message and the user information, or a personalized event message is generated using the artist event message and the user information, and wherein in the step of displaying the personalized message, the personalized scheduled message is displayed on the user application at a predetermined scheduled time, or the personalized event message is displayed on the user application when a predetermined event occurs.

11. The personalized messaging service method of claim 7, wherein the user information comprises a user language which used by the user, and when the artist message is written in a language other than the reference language, the artist message is translated into the preset reference language, and in the step of displaying the personalized message, the reference language is translated into the user language, and a translated personalized message is displayed, and a translation of the user language is performed through machine translation or artificial intelligence translation.

* * * * *